United States Patent
Hung

(10) Patent No.: US 11,283,642 B2
(45) Date of Patent: Mar. 22, 2022

(54) EVENT MANAGEMENT METHOD AND EVENT MANAGEMENT DEVICE

(71) Applicant: Yi-Pang Hung, Taipei (TW)

(72) Inventor: Yi-Pang Hung, Taipei (TW)

( * ) Notice: Subject to any disclaimer, the term of this patent is extended or adjusted under 35 U.S.C. 154(b) by 264 days.

(21) Appl. No.: 16/503,986

(22) Filed: Jul. 5, 2019

(65) Prior Publication Data

US 2021/0006428 A1 Jan. 7, 2021

(51) Int. Cl.
| | |
|---|---|
| *G08B 13/00* | (2006.01) |
| *H04L 12/28* | (2006.01) |
| *H04W 12/06* | (2021.01) |
| *G08B 13/196* | (2006.01) |
| *G05B 15/02* | (2006.01) |

(52) U.S. Cl.
CPC .......... *H04L 12/2825* (2013.01); *G05B 15/02* (2013.01); *G08B 13/19669* (2013.01); *H04W 12/06* (2013.01); *H04L 2012/2841* (2013.01)

(58) Field of Classification Search
None
See application file for complete search history.

(56) References Cited

U.S. PATENT DOCUMENTS

| | | | |
|---|---|---|---|
| 9,672,717 B1* | 6/2017 | Slavin | G08B 5/36 |
| 10,127,798 B1 | 11/2018 | Trundle et al. | |
| 2008/0284580 A1* | 11/2008 | Babich | G08B 13/19697 340/502 |
| 2010/0271205 A1* | 10/2010 | Saunders | G08B 5/38 340/541 |
| 2011/0309929 A1* | 12/2011 | Myers | G08B 6/00 340/539.11 |
| 2012/0019353 A1* | 1/2012 | Knasel | G08B 25/008 340/4.35 |
| 2015/0188725 A1 | 7/2015 | Coles | |
| 2016/0217677 A1* | 7/2016 | Ding | G08B 13/1968 |

* cited by examiner

*Primary Examiner* — Paul B Yanchus, III
(74) *Attorney, Agent, or Firm* — Birch, Stewart, Kolasch & Birch, LLP

(57) ABSTRACT

Disclosed are an event management method and an event management device. The event management method is performed by the event management device. When performing a home mode, the event management device determines if there is a mobile device available and passing an authentication procedure. After determining that there is a mobile device available and passing the authentication procedure, the event management device determine if there is a mobile device available and passing the authentication procedure. When there is no mobile device that passes the authentication procedure, the event management device performs an unmanned mode. When performing the unmanned mode, the event management device further determines if an event activation signal is generated. When determining that the event activation signal is generated, the event management device performs an alert mode to take corresponding actions according to various event signals.

17 Claims, 11 Drawing Sheets

EVENT MANAGEMENT METHOD AND EVENT MANAGEMENT DEVICE

BACKGROUND OF THE INVENTION

1. Field of the Invention

The present invention relates to a management method and a management system and, more particularly, to an event management method and an event management device.

2. Description of the Related Art

Life and living spaces of modernized people are full of a variety of electric appliances, for instance, including computers, electric fans, air conditioners, lamps and the like in the offices, or televisions, computers, electric fans, air conditioners, lamps, water heaters, refrigerators and the like at home.

After users activate those electric appliances for operation, those electric appliances start consuming power. When those electric appliances are not required for operation, users must shut down those electric appliances or control them to enter a standby condition for reducing power consumption and avoiding electricity waste before leaving. However, if those electric appliances remain operational because users rush to leave without turning off them, unnecessary electricity waste becomes inevitable.

When people are away and leave those electric appliances on, besides electricity waste, catastrophic results, such as fire caused by continuous operation of electric heater, may arise from the unattended situation.

Besides the catastrophic results, owing to the concern for privacy, users of surveillance system would like to shut down the system when they are at home or in the office while such concern may invalidate the purpose of the surveillance system if the alarm setting of the surveillance system is not activated again after the shutdown of the surveillance system.

Additionally, for sake of cost concern, cyclic recording is normally applied to save cost with less storage space for conventional surveillance system at the cost of older but critical video overwritten by newer video. Should video of important event be recorded long time ago, such video may not be there any more as a result of the cyclic recording. Hence, the way of managing conventional electric appliances should be further improved.

SUMMARY OF THE INVENTION

An objective of the present invention is to provide an event management method and an event management device capable of automatically performing corresponding functions on the basis of users' presence to save power and secure users' safety.

To achieve the foregoing objective, the event management method is performed by a main controller unit of an event management device. The event management device includes at least one sensing unit and at least one event execution unit. The event management method includes:
  performing an unmanned mode to generate an unmanned event signal and transmit the unmanned event signal to each of the at least one event execution unit;
  determining if any of the at least one sensing unit generates an event activation signal;
  when determining that the event activation signal is generated, performing an alert mode to generate an alert event signal and transmit the alert event signal to a corresponding event execution unit;
  determining if the main controller unit receives a home mode configuration signal;
  when determining that the home mode configuration signal is received, performing a home mode to generate a home event signal and transmit the home event signal to each of the at least one event execution unit;
  determining if there is any mobile device available and passing an authentication procedure;
  when determining that there is any mobile device available and passing the authentication procedure, resuming determining if there is any mobile device available and passing the authentication procedure, otherwise, performing the unmanned mode;
  when determining that the home mode configuration signal is not received, determining if the main controller unit receives an unmanned mode configuration signal, otherwise, perform the home mode; and when determining that the unmanned mode configuration signal is received, performing the unmanned mode, otherwise, resuming determining if the main controller unit receives the home mode configuration signal.

To achieve the foregoing objective, the event management device includes at least one sensing unit, at least one event execution unit and a main controller unit.

The main controller unit is connected to the at least one sensing unit and the at least one event execution unit, performs an unmanned mode, and determines if any of the at least one sensing unit generates an unmanned event signal and transmits the unmanned event signal to a corresponding execution unit.

When any of the at least one sensing unit generates the event activation signal, the main controller unit performs a alert mode to generate an alert event signal and transmit the alert event signal to the corresponding event execution unit and determines if a home mode configuration signal is received.

When the home mode configuration signal is received, the main controller unit performs a home mode to generate a home event signal and transmit the home event signal to each of the at least one event execution unit and determines if there is any mobile device available and passing an authentication procedure.

When determining that there is any mobile device available and passing the authentication procedure, the main controller unit resumes determining if there is any mobile device available and passing the authentication procedure. Otherwise, the main controller unit performs the unmanned mode.

When determining that the home mode configuration signal is not received, the main controller unit determines if the main controller unit receives an unmanned mode configuration signal. Otherwise, the main controller unit performs the home mode.

When determining that the unmanned mode configuration signal is received, the main controller unit performs the unmanned mode. Otherwise, the main controller unit resumes determining if the main controller unit receives the home mode configuration signal.

The foregoing event management method is performed by the main controller unit of the event management device. When performing the home mode, the main controller unit determines if there is a mobile available and passing the authentication procedure to verify the currently available mobile device is in the proximity of the event management device, so as to ascertain if the user is at home. When the available mobile device is passing the authentication procedure, the main controller unit confirms that the user is at home and determines if the available mobile device passes the authentication procedure. When performing the home mode and generating the home event signal, the main controller unit controls the at least one event execution unit to carry out a corresponding manned action, such as automatically turning on a lamp or an air conditioner, or turning off the cameras of a surveillance system. When the mobile device fails to pass the authentication procedure, the main controller unit performs the unmanned mode to generate the unmanned event signal to control the at least one event execution unit to carry out corresponding an unmanned action, such as automatically turning off a lamp and air conditioner. In addition, when performing the unmanned mode, the main controller unit further determines if any of the at least one sensing unit generates the event activation signal for determination of stranger intrusion. When the event activation signal is generated, it indicates that stranger intrusion takes place. Meanwhile, when there is no one at home, the main controller unit performs the alert mode to generate the alert event signal, so as to control corresponding event execution unit to perform an alert action, such as activating the cameras of a surveillance system.

Thus, the event management device may automatically switch modes and automatically control the at least one event execution unit to perform corresponding actions for avoidance of unnecessary electricity waste and protection of users' privacy. The surveillance system can be started at any critical moment to record crucial video without erasing important video for sake of cyclic recording.

Other objectives, advantages and novel features of the invention will become more apparent from the following detailed description when taken in conjunction with the accompanying drawings.

DETAILED DESCRIPTION OF THE INVENTION

Figure 1A:
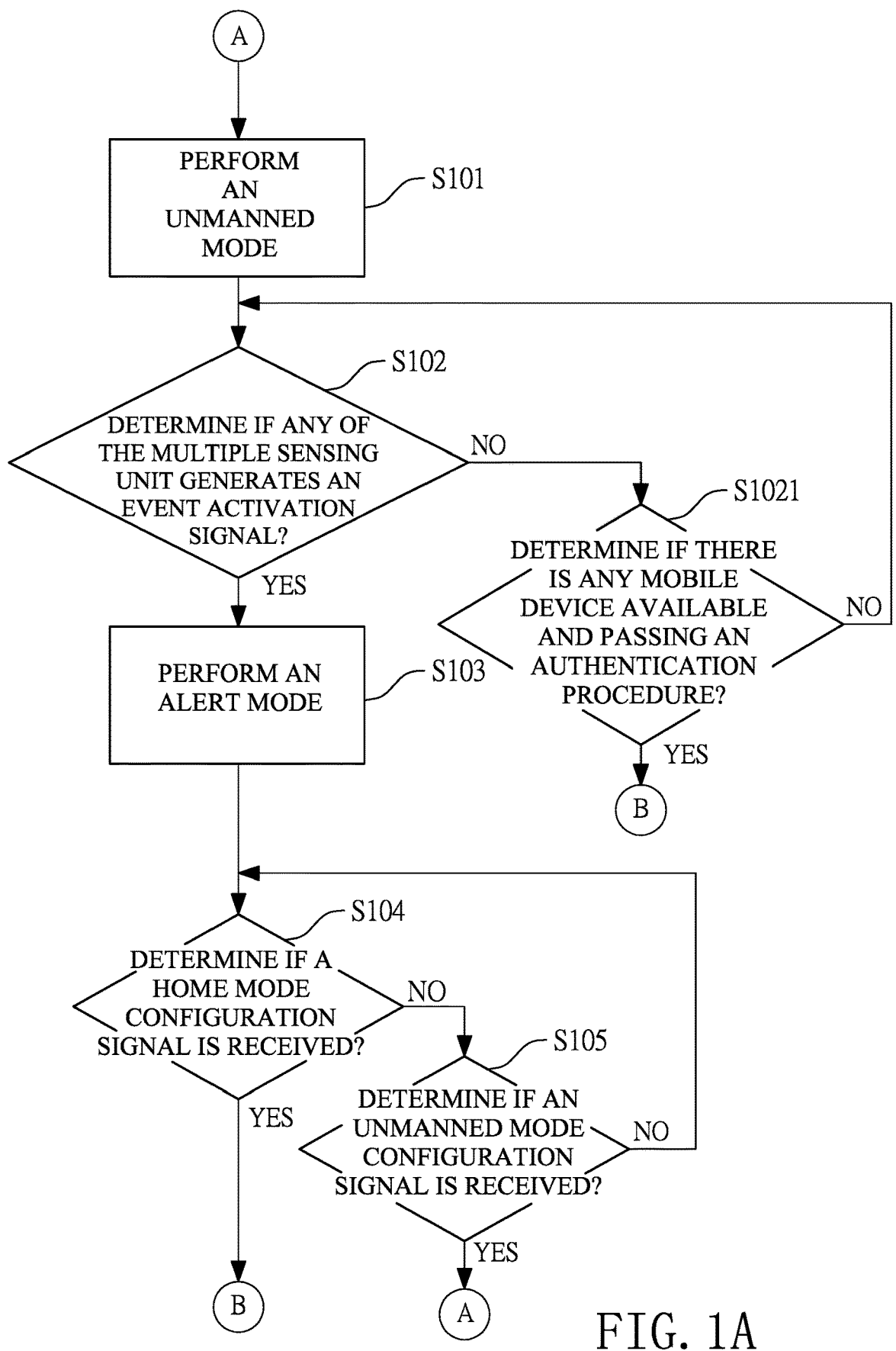
FIGS. 1A and 1B show a flow diagram of a first embodiment of an event management method in accordance with the present invention.
Figure 1B:
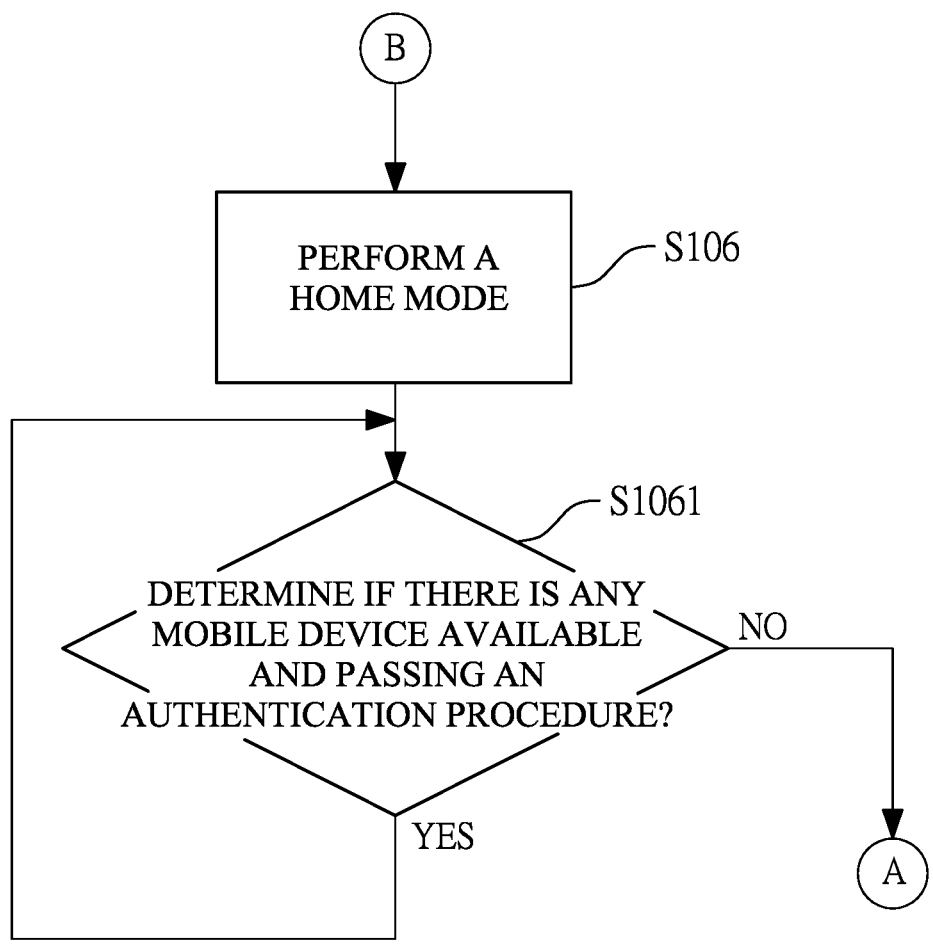

With reference to FIGS. 1A and 1B, an event management method in accordance with the present invention is performed by an event management device, which includes a main controller unit, at least one sensing unit and at least one event execution unit, and includes steps sequentially performed as follows:

Step S101: Perform an unmanned mode to generate an unmanned event signal and transmit the unmanned event signal to each of the at least one event execution unit.

Step S102: Determine if any of the multiple sensing unit generates an event activation signal. If positive, perform step S103. Otherwise, perform step S1021.

Step S1021: Determine if there is any mobile device available and passing an authentication procedure. When there is any mobile device available and passing the authentication procedure, perform step S106. Otherwise, resume step S102.

Step S103: Perform an alert mode to generate an alert event signal and transmit the alert event signal to a corresponding event execution unit.

Step S104: Determine if a home mode configuration signal is received. When the main controller unit receives the home mode configuration signal, perform step S106. Otherwise, perform step S105.

Step S105: Determine if an unmanned mode configuration signal is received. When the main controller unit receives the unmanned mode configuration signal, perform step S101. Otherwise, resume step S104.

Step S106: Perform a home mode to generate a home event signal and transmit the home event signal to each of the at least one event execution unit.

Step S1061: Determine if there is any mobile device available and passing the authentication procedure. When there is any mobile device available and passing the authentication procedure, resume step S1061. Otherwise, perform step S101.

Figure 2:
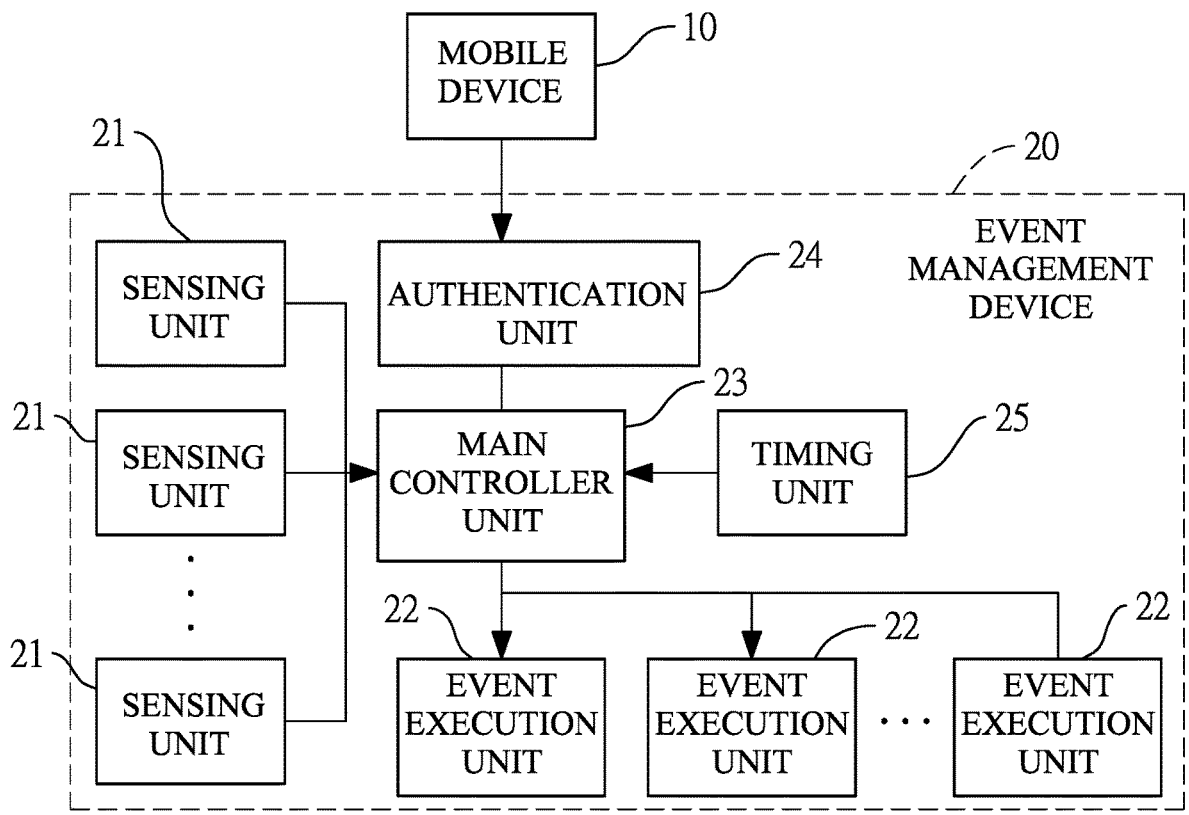
FIG. 2 is a functional block diagram of an event management device in accordance with the present invention.

With reference to FIG. 2, the event management device 20 includes the at least one sensing units 21, the at least one event execution unit 22 and the main controller unit 23.

The main controller unit 23 performs the unmanned mode to determine if any of the at least one sensing unit 21 generates the event activation signal. When performing the unmanned mode, the main controller unit 23 generates the unmanned event signal and transmits the unmanned event signal to each of the at least one event execution unit 22.

When any of the at least one sensing unit 21 generates the event activation signal, the main controller unit 23 performs an alert mode and determines if the home mode configuration signal is received. When performing the unmanned mode, the main controller unit 23 generates the alert event signal and transmits the alert event signal to the corresponding event execution unit 22.

When receiving the home mode configuration signal, the main controller 23 performs the home mode and further determine if there is any mobile device 10 available and passing the authentication procedure. When performing the home mode, the main controller unit 23 generates the home event signal and transmit the home event signal to each of the at least one event execution unit 22.

When there is any mobile device 10 available and passes the authentication procedure, the main controller unit 23 determines if the available mobile device 10 passes the authentication procedure under the home mode.

When there is no mobile device passing the authentication procedure, the main controller unit 23 performs the unmanned mode.

When receiving not home mode configuration signal, the main controller unit 23 further determines if the unmanned mode configuration signal is received.

When receiving the unmanned mode configuration signal, the main controller unit performs the unmanned mode.

When receiving no unmanned mode configuration signal, the main controller unit 23 determines if the home mode configuration signal is received again.

Besides, the event management device 20 further includes an authentication unit 24. The authentication unit 24 is connected to the main controller unit 23 by a wireless or wired means, and is wirelessly connected to the mobile device 10. The authentication unit 24 serves to perform the authentication procedure to determine if there is a mobile device 10 passes the authentication procedure so as to determine if a user is present. When there is any mobile device 10 available and passing the authentication procedure, the authentication unit 24 generates an authentication completion signal and transmits the authentication completion signal to the main controller unit 23. When receiving the authentication completion signal, the main controller unit 23 determines that the mobile device 10 passes the authentication procedure.

When the main controller unit 23 performs the unmanned mode and when any one of the at least one sensing unit 21 does not generate the event activation signal, the main controller unit 23 further determines if there is any mobile device 10 available and passing the authentication procedure. When there is any mobile device 10 available and passing the authentication procedure, the main controller unit 23 performs the home mode. When there is no mobile device or the available mobile device fails to pass the authentication procedure, the main controller unit 23 determines if any of the at least one sensing unit generates the event activation signal again.

The present invention has three objectives. The first one is to reduce user's operation as much as possible for assurance of higher degree of automation. The second one is to provide a unified interface for all elements of the event management device to jointly operate for assurance of element diversification, less design complication and enhanced reusability. The third one is to provide a flexible system tailored to various customer's requirements.

Figure 3:
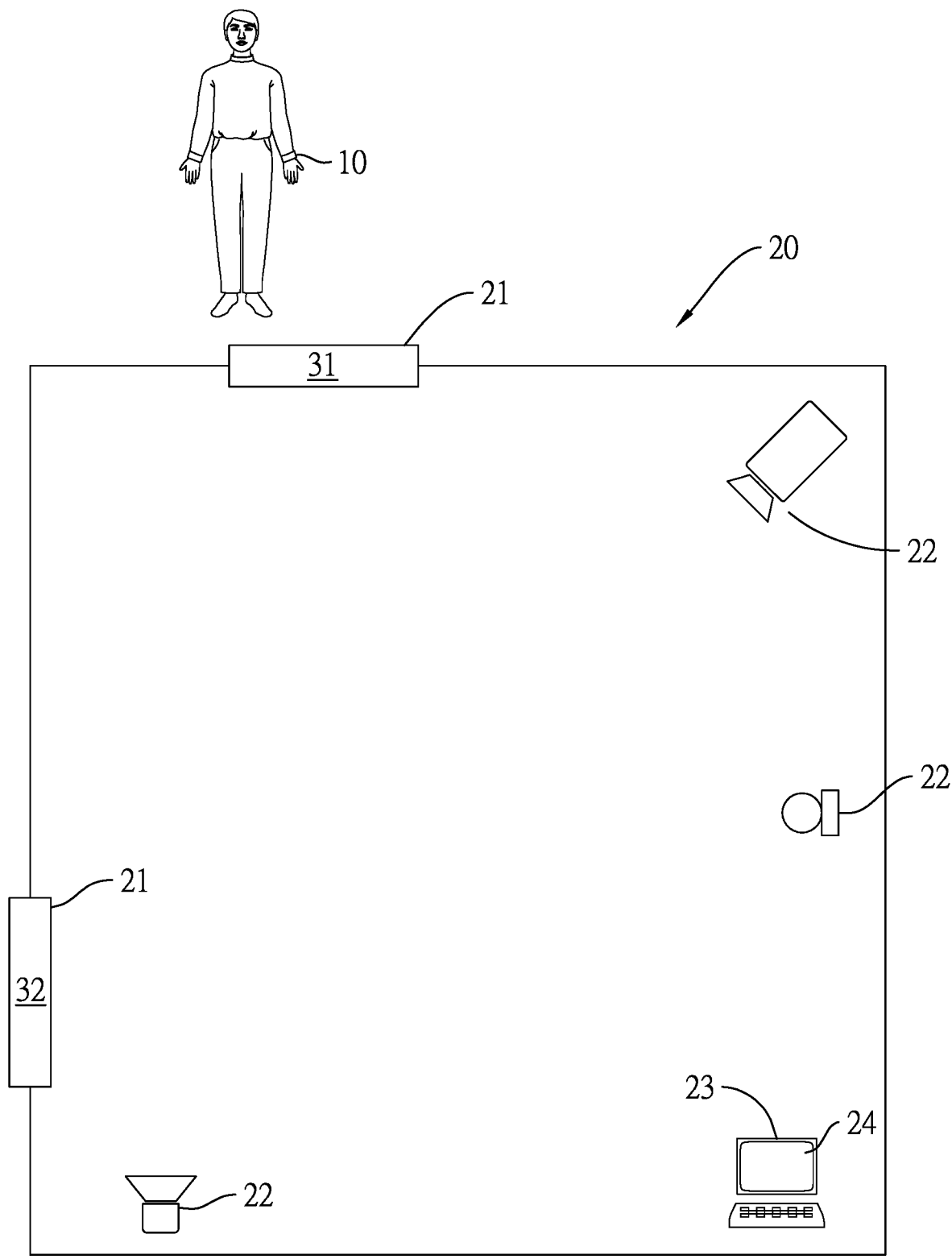
FIG. 3 is an operational schematic diagram of the event management device in FIG. 2.

For example, with reference to FIG. 3, the at least one sensing unit 21 function to detect if a region is intruded for monitoring activity taking place in the region. Each sensing unit 21 includes at least one sensor each of which may be one of an infrared break-beam sensor, a magnetic sensor, a motion detector, a weight sensor, and the like or an intelligent surveillance camera for detecting and determining if any person appears in the region. In an embodiment a magnetic sensor is provided at a main entrance to determine if the door is opened or if an intrusion is taking place.

When detecting that the region is intruded by anyone or anything, the sensing unit 21 sends an event activation signal to the main controller unit 23 via a wired or wireless means.

The mobile device 10 is carried by the user and is provided for the authentication unit 24 to perform the authentication procedure such that the authentication unit 24 is allowed to determine if the user is present. The mobile device may be a wireless device connected to the main controller unit 23. Furthermore, the mobile device 10 may be a wearable device which may be one of a smart watch, a smart ring, a smart earring, a smart necklace, a smart keychain, and the like or a portable electronic device which may be one of a smart phone, a tablet personal computer and the like for the user to carry with himself/herself.

In the present embodiment, the mobile device 10 and the authentication unit 24 of the event management device 20 perform authentication by way of a wireless means, such as Bluetooth °, Bluetooth Low Energy °, Zigbee, WiFi or other wireless protocols.

The authentication unit 24 is connected to the main controller unit 23 by a wired or wireless means and includes at least one wireless module for scanning the mobile device 10 or is connected to the mobile device 10.

Besides, before the main controller unit 23 performs the event management method, the mobile device 10 has to perform registration at the authentication unit 24 such that the authentication unit 24 records registration information of the mobile device 10. After the authentication device 24 completes the registration of the mobile device 10, the mobile device 10 done with the registration at the authentication unit 24 is considered by the authentication unit 24 to pass the authentication procedure, indicating that the user carrying the mobile device is in the proximity of the event management device 20.

The main controller unit 23 instructs the authentication unit 24 to perform or terminate the authentication procedure, and the authentication unit 24 will forward an authentication result to the main controller unit 23. For example, when determining if the mobile device 10 passes the authentication procedure, the authentication unit 24 generates an authentication completion signal and transmits the authentication completion signal to the main controller unit 23. When failing to detect wireless signal of the mobile device 10, the authentication unit 24 generates an authentication failure signal and transmits the authentication failure signal to the main controller unit 23. As both the authentication completion signal and the authentication failure signal have information associated with the mobile device 10, the main controller unit 23 can be aware of the quantity and information of the mobile device 10 currently passing the authentication procedure.

The main controller unit 23 owns a list of authenticated mobile device for recording information associated with the mobile device 10 which has completed or passed the authentication. After receiving the authentication completion signal, the main controller unit 23 adds the information of the mobile device 10 done with the authentication to the list of authenticated mobile device. After receiving the authentication failure signal, the main controller unit 23 removes the information of the mobile device 10 corresponding to the authentication failure signal from the list of authenticated mobile device. Thus, as long as the main controller unit 23 checks the information in the list of authenticated mobile device, the quantity and information of the mobile device 10 currently completing the authentication procedure as criteria for performing next state can be known to the main controller unit 23.

Each event execution unit 22 receive the home event signal generated by main controller unit 23 via a wired or wireless means, the unmanned event signal or the alert event signal issued by the main controller unit 23 and take action corresponding to the received signal.

With reference to FIGS. 1A and 1B, the main controller unit 23 records an activity mode currently and sends an event signal pertinent to the activity mode. The main controller unit 23 performs three different modes, namely the unmanned mode, the alert mode and the home mode indicative of no user in the proximity of the main controller unit 23, detection of intrusive activity, and user at home respectively. After switching to a next mode, the main controller unit 23 will transmit a corresponding event signal to the event execution unit 22 for the event execution unit 22 to take corresponding action according to the newly switched mode.

Furthermore, when starting operation, the main controller unit 23 can start from the unmanned mode or the home mode and activate the authentication unit 24 to perform the authentication procedure so as to determine if the mobile device 10 passes the authentication procedure. In one embodiment, the home mode is the preferred mode to be started.

Prior to activation of the authentication unit 24, the mobile device 10 must register on the authentication unit 24, such that the authentication unit 24 records the registration information of the mobile device as the information for determining if the mobile device 10 passes the authentication procedure.

The simplest authentication procedure is that the at least one wireless module of the authentication unit 24 scans wireless signal transmitted from the mobile device 10. As the mobile device 10 has registered on the authentication unit 24, the authentication unit 24 compares device information in the wireless signal sent from the mobile device 10 with the registration information of the mobile device 10 to see if they are matched as the measure of authentication.

The authentication unit 24 has a recording list for recording the information of each mobile device 10 currently done with the authentication procedure and the most recent time when the authentication unit 24 receives the wireless signal transmitted from the mobile device 10. When receiving the wireless signal issued from the registered mobile device 10 but not recorded in recording list, the authentication unit 24 adds the information and the time of the received wireless signal corresponding to the mobile device 10 in the recording list and issues an authentication completion signal containing the information of the mobile device 10. When receiving the wireless signal sent from the mobile device 10 and recording the information and time of the wireless signal in the recording list, the authentication unit 24 updates the time for receiving the wireless signal to current time. When realizing that a time gap between the current time and the time recorded in the recording list is greater than a preset time duration, it indicates that the mobile device 10 has not been around the authentication unit 24, and the information of the mobile device 10 should be deleted from the recording list and the authentication unit 24 issues an authentication failure signal containing the information of the mobile device 10.

Figure 4:
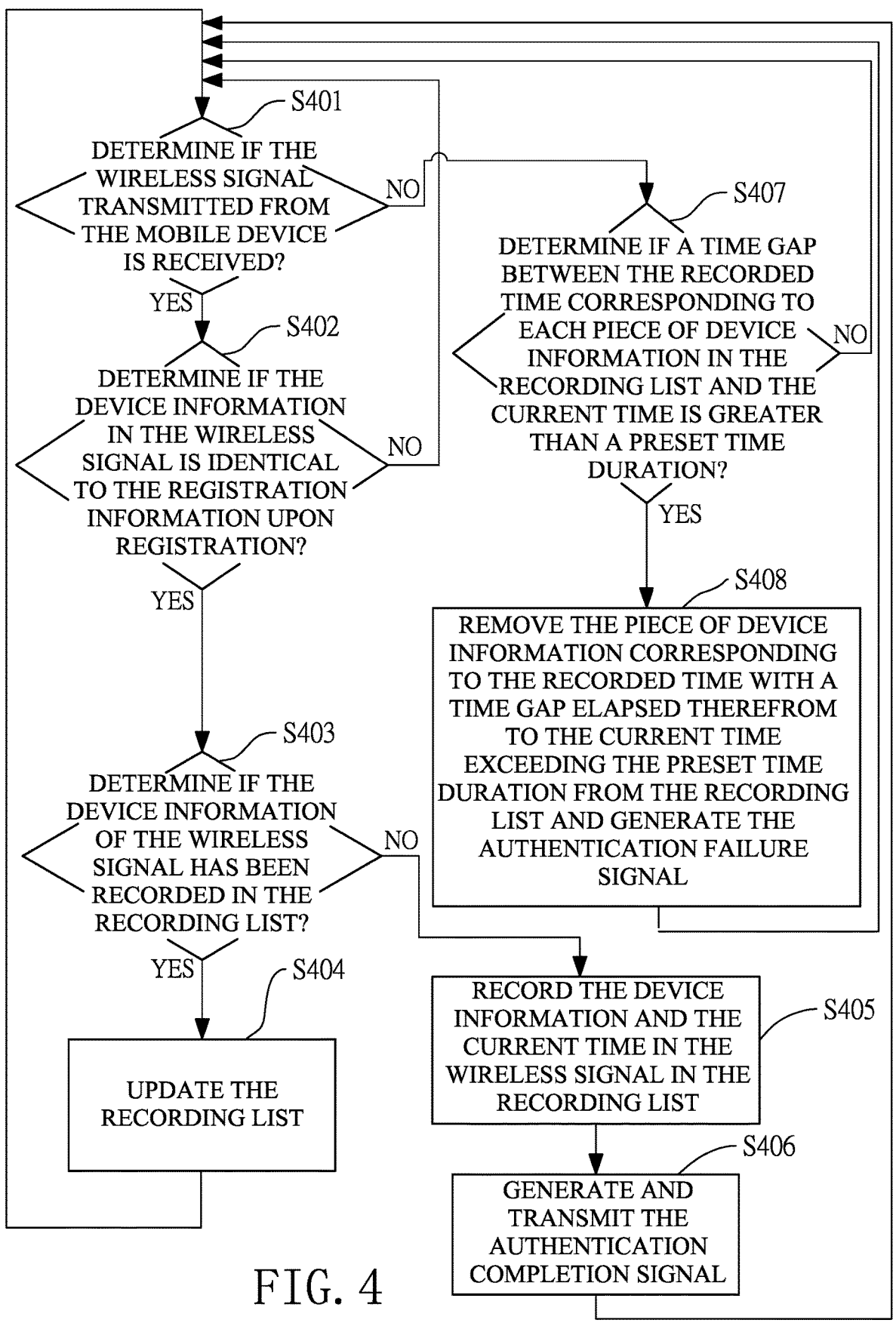
FIG. 4 is a flow diagram of a first embodiment of an authentication procedure of the event management method in FIGS. 1A and 1B.

For example, with reference to FIG. 4, an embodiment of the authentication procedure is a scan-based authentication procedure, which is performed by the authentication unit 24 and include the following steps.

Step S401: Determine if the wireless signal transmitted from the mobile device is received. When the wireless signal is received, perform step S402. Otherwise, perform step S407.

Step S402: Determine if the device information in the wireless signal is identical to the registration information upon registration of the mobile device. When the device information is identical to the registration information, perform step S403. Otherwise, perform step S401.

Step S403: Determine if the device information of the wireless signal has been recorded in the recording list upon registration of the mobile device at the authentication unit. When the device information has been recorded, perform step S404. Otherwise, perform step S405.

Step S404: Update the recording list by changing a recorded time corresponding to the device information of the wireless signal to the current time and resume step S401.

Step S405: Record the device information and the current time in the wireless signal in the recording list.

Step S406: Generate and transmit the authentication completion signal and resume step S401.

Step S407: Determine if a time gap between the recorded time corresponding to each piece of device information in the recording list and the current time is greater than a preset time duration. When the time gap is greater than the preset time duration, perform step S408. Otherwise, perform step S401.

Step S408: Remove the piece of device information corresponding to the recorded time with a time gap elapsed therefrom to the current time exceeding the preset time duration from the recording list and generate the authentication failure signal and resume step S401.

As the wireless signal of the mobile device 10 may be subject to the interception of intentional parties, an advanced connection-based authentication procedure brings into play. In view of the registration of the mobile device 10 at the authentication unit 24, it is only the mobile device that completes registration can establish connection. Thus, when the authentication unit 24 establishes connection with the mobile device 10, the mobile device is considered to pass the authentication procedure.

In another embodiment, the mobile device can save passwords to establish connection without the registration. For example, the authentication unit 24 is a Wifi access point (AP), the mobile device 10 is a smart phone of a user, and the smart phone saves the passwords which can login the Wifi AP. Therefore, when the smart phone login the Wifi AP, the smart phone can establish the connection with the Wifi AP, and the smart phone is considered to pass the authentication procedure.

Similar to the scan-based authentication procedure, the connection-based authentication procedure also includes a recording list recording each mobile device 10 currently done with the authentication procedure. After the connection is established, the authentication unit 24 adds information associated with the connected mobile device 10 to the recording list and issues the authentication completion signal containing the information of the mobile device 10. After the mobile device lost connection with the authentication unit 24, the authentication unit 24 removes the information of the disconnected mobile device 10 from the recording list and issues the authentication failure signal containing the information of the disconnected mobile device 10.

Figure 5A:
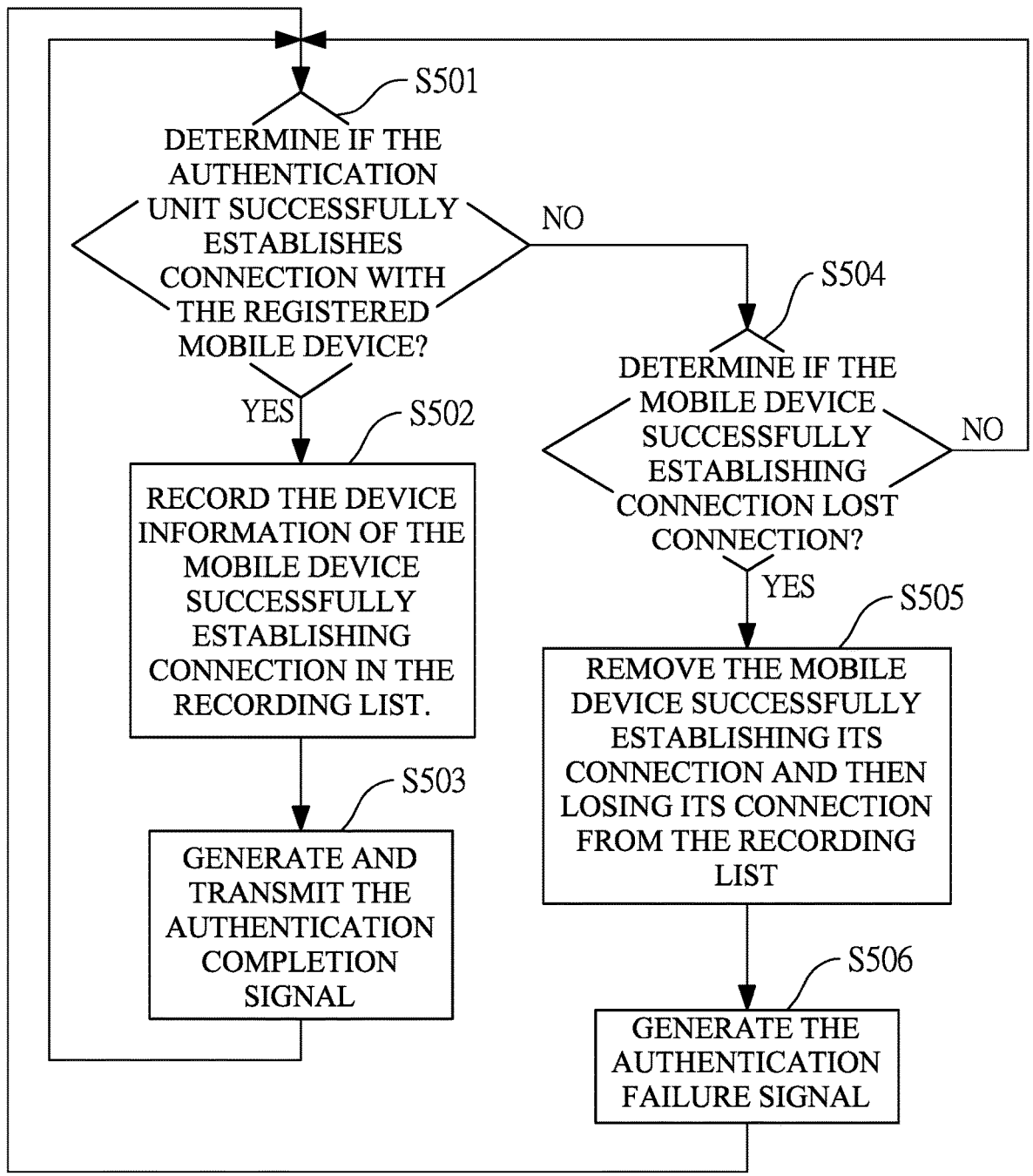
FIGS. 5A and 5B show a flow diagram of a second embodiment of the authentication procedure of the event management method in FIGS. 1A and 1B.

For example, with reference to FIG. 5A, another embodiment of the authentication procedure is performed by the authentication unit and includes the following steps.

Step S501: Determine if the authentication unit successfully establishes connection with the registered mobile device. When the connection is successfully established, perform step S501. Otherwise, perform step S504.

Step S502: Record the device information of the mobile device successfully establishing connection in the recording list.

Step S503: Generate and transmit the authentication completion signal and resume step S501.

Step S504: Determine if the mobile device successfully establishing connection lost connection. When the mobile device lost its connection, perform step S505. Otherwise, perform step S501.

Step S505: Remove the mobile device successfully establishing its connection and then losing its connection from the recording list.

Step S506: Generate the authentication failure signal and resume step S501.

There are chances that intentional parties may intrude the home of a user of a mobile device by way of stealing the mobile device. To circumvent the situation, one more authentication to users can be added to the mobile device 10.

In one embodiment, the main controller unit 23 or each event execution unit 22 or the mobile device 10 includes an alphanumerical input module for users to input password and enter the password at registration. When the authentication unit 24 performs the authentication procedure, the authentication unit 24 will pass the information of the mobile device 10 with which the authentication unit 24 is performing the authentication procedure to the main controller unit 23. The main controller unit 23 then utter a cue tone to prompt the user to enter password. The authentication procedure is completed until the user enters the correct password.

However, in the case of connection-based authentication procedure, the connection between the mobile device 10 and the authentication unit 24 may be disconnected when the wireless signal is interfered. When the user is at home, it happens that the main controller unit 23 switches to the unmanned mode and a part of the at least one event execution unit 22 shut down corresponding electric appliance(s) to thus cause inconvenience to the user because of lost connection between the authentication unit 24 and the mobile device 10. To avoid the issue, when the connection-based authentication procedure is performed, a reconnection authentication procedure should be included.

The reconnection authentication procedure targets at automatically establishing connection again within a preset period of time after the disconnection. After the connection fails to be established again within the preset period of time, the authentication failure signal can then be issued. In the reconnection authentication procedure, there are two lists one of which is a connection list and the other is a reconnection list. The connection list records each mobile device 10 already connected. The reconnection list records the device information of each mobile device 10 and the time that lost connection. When the connection is established, the authentication unit 24 will add the device information of the mobile device 10 to the connection list and issues the authentication completion signal.

When the mobile device 10 is disconnected from the authentication unit 24, the authentication unit 24 will remove the device information of the mobile device 10 from the connection list, and add the device information of the mobile device and record a disconnection time to the reconnection list. When a time gap between the current time and the disconnection time in the reconnection list exceeds a preset time duration, the authentication unit 24 issues the authentication failure signal and removes the device information of the mobile device 10 from the reconnection list.

When the mobile device establishes connection with the authentication unit 24 and appears in the reconnection list, the device information of the mobile device 10 is removed from the reconnection list and is added to the connection list. Accordingly, the authentication unit 24 will automatically establish connection and will not cause user's inconvenience when the mobile device 10 is disconnected from the authentication unit 24 unexpectedly.

Figure 5B:
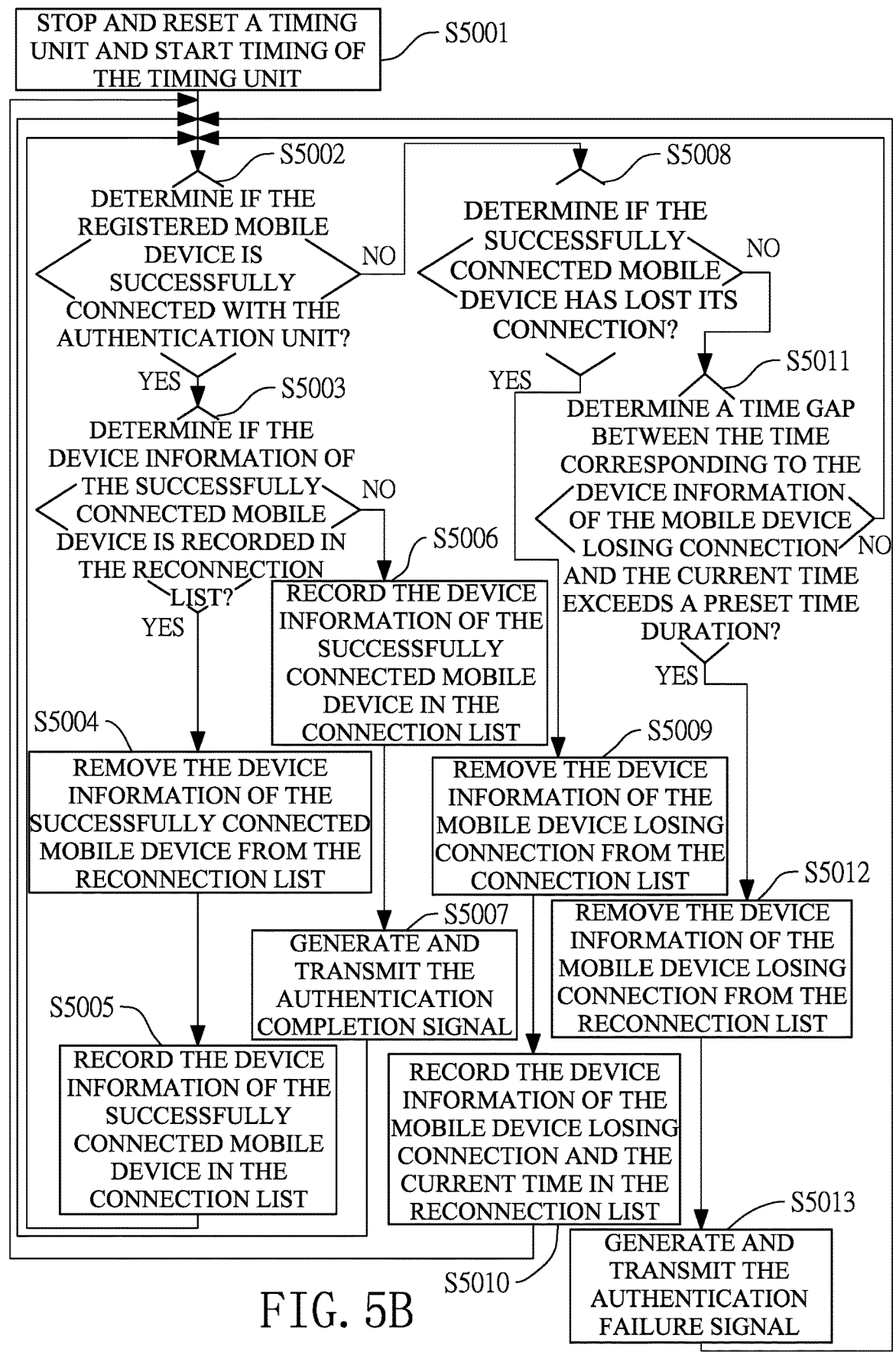

For example, with reference to FIG. 5B, when the main controller unit 23 performs the home mode, the authentication unit 24 performs the reconnection authentication procedure, which includes the following steps.

Step S5001: Stop and reset a timing unit and start timing of the timing unit.

Step S5002: Determine if the registered mobile device is successfully connected with the authentication unit. When the registered mobile device is successfully connected, perform step S5003. Otherwise, perform step S5008.

Step S5003: Determine if the device information of the successfully connected mobile device is recorded in the reconnection list. When the device information is recorded in the reconnection list, perform step S5004. Otherwise, perform step S5006.

Step S5004: Remove the device information of the successfully connected mobile device from the reconnection list.

Step S5005: Record the device information of the successfully connected mobile device in the connection list and resume step S5002.

Step S5006: Record the device information of the successfully connected mobile device in the connection list.

Step S5007: Generate and transmit the authentication completion signal containing the device information of the successfully connected mobile device and resume step S5002.

Step S5008: Determine if the successfully connected mobile device has lost its connection. When the connection is lost, perform step S5009. Otherwise, perform step S5011.

Step S5009: Remove the device information of the mobile device losing connection from the connection list.

Step S5010: Record the device information of the mobile device losing connection and the current time in the reconnection list and resume step S5002.

Step S5011: Determine a time gap between the time corresponding to the device information of the mobile device losing connection and the current time exceeds a preset time duration. When the time gap exceeds the preset time duration, perform step S5012. Otherwise, resume step S5002.

Step S5012: Remove the device information of the mobile device losing connection from the reconnection list.

Step S5013: Generate and transmit the authentication failure signal and resume step S5002.

In another embodiment, when performing the authentication procedure, the main controller unit 23 first connects to a server through which transmits a message to user's mobile device 10 for the mobile device 10 to launch a corresponding application, which requests the user to input password within a predetermined time. After the user inputs the correct password, the password is transmitted to the server for authentication. When authenticating that the password is correct, the server returns the authentication completion signal to the main controller unit 23 in completion of the authentication procedure.

After entering the unmanned mode, the main controller unit 23 transmits the unmanned event signal to each of the at least one event execution unit 22. During the unmanned mode, the main controller unit 23 will monitor the event activation signal transmitted from any of the at least one sensing unit 21. When the main controller unit 23 receives the event activation signal in the unmanned mode, it indicates that there is intrusion into a monitored region. Thus, the main controller unit 23 switches to perform the alert mode.

When the authentication unit 24 performs the authentication procedure on each mobile device 10 under the unmanned mode and determines that at least one mobile device 10 passes the authentication procedure, it indicates that at least one user returns to the monitored region. Thus, the authentication unit 24 generates the authentication completion signal for the main controller unit 10 to switch the home mode for operation.

After entering the alert mode, the main controller unit 23 transmits the alert event signal to the corresponding event execution unit 22, waits for user's intervention, and determines if an unmanned mode configuration signal or a home mode configuration signal is received after determining that user's intervention is detected. After the user's intervention is detected, the user is allowed to configure the main controller unit 23 based on demands to return to the unmanned mode or the home mode. For example, the user can configure the main controller unit 23 to automatically switch to the unmanned mode after 30 minutes spent in the alert mode, or configure the main controller unit 23 to enter the home mode after the authentication unit 24 establishes connection with the mobile device 10 and determines that the mobile device 10 passes the authentication procedure. Moreover, in the event of malfunction of the sensing unit 21 or cat or dog intrusion, after the user confirms that there is no safety concern, the main controller unit 23 receives a configuration signal sent from the mobile device 10 or from a remote end via a network to switch to the unmanned mode or the home mode for operation and the associated operation may be at the discretion of the user.

After entering the home mode, the main controller unit 23 will transmit the home event signal to each event execution unit 22. When the main controller unit 23 receives the authentication failure signal sent from the authentication unit 24 and determines that no any mobile device 10 is positioned at the condition done with the authentication, it indicates that there is no one is present at home and the main controller unit 23 switches to the unmanned mode for operation.

The event execution unit 22 performs corresponding action according to the event signal sent from the main controller unit 23.

With reference to FIG. 3, operation of the event management device 20 is shown. The event management device 20 includes a smart phone and at least one sensing unit 21. The smart phone has software application installed therein and includes a main controller unit 23, and an authentication unit 24 and multiple event execution units 22, which are shown in a separate way to facilitate illustration of different elements. The user of the event management device 20 carries a smart keychain, which is registered and authenticated through the authentication unit 24. The main controller unit 23 controls a room which is the region to be monitored and includes two places for in and out one of which is a main gate 31 and the other is a window 32. Two magnetic sensors that are respectively installed on tops of the two places are taken as the sensing units 21 to sense if the door and the window of the two placed are open. Besides, a video recorder, a siren speaker, and a lamp that are installed inside the room are taken as the event execution units 22.

The user of the event management device 20 expects to automatically turn off the lamp before leaving home to save electricity. The lamp is designed with the ability of handling the unmanned event signal, meaning that after receiving the unmanned event signal, the lamp will automatically turn off for saving electricity.

The user also expects that the video recorder starts recording and the siren speaker utters an alert siren to deter an intruder upon intrusion into the monitored region. Thus, the video recorder and the siren speaker can be designed to handle the alert event signal. When receiving the event activation signal transmitted from the magnetic sensor, the main controller unit 23 transmits the alert event signal to the video recorder and the siren speaker to active the video recorder and the siren speaker, transmits an alert notification to the smart phone of the user through a network, and upload a recorded video to a server to facilitate the user's comprehensive awareness of current situation in the room. Moreover, a video recording module of the smart phone can be also taken as one of the event execution units 22 with the functions identical to those of the foregoing video recorder.

The event execution units 22 can also process various events, for example, switching the lamp on and off after the lamp receives the alert event signal to scare away the intruder, or automatically turning on the lamp after the lamp receives the home event signal, which can be all user-configurable to tailor user's needs.

Therefore, the present invention relates to an automation system. When the user leaves the monitored region, the system turns off relevant electric appliances. After the user go home, the system automatically turns on the relevant electric appliances. When the user is not around and intrusion into the monitored region, the system can also turn on relevant equipment and notify the user.

Each of the main controller unit 23, the sensing units 21 and the event execution units may be a piece of hardware or a piece of software. In an embodiment, the main controller unit 23, the event execution units 22 and the sensing units 21 may be different software applications in a smart phone. The smart phone may be mounted on a door. When someone opens the door, the application of the sensing unit 21 senses the movement of the smart phone and transmits the event activation signal to the application of the main controller unit 23 for the application of the main controller unit 23 to issue the alert event signal to the application of the corresponding event execution unit 22 to turn on the video recording module of the smart phone for recording or transmit a short message to the user.

Alternatively, one sensing unit 21 and a corresponding event execution unit 22 can be integrated into a same piece of hardware, such as a smart video recorder, to detect if anyone intrudes a monitored region. When someone intrudes the monitored region, the event activation signal is transmitted to the main controller unit 23. The main controller unit 23 transmits the alert event signal to the smart video recorder when determining that the user is not present at the monitored region, and the smart video recorder starts recording. In the present embodiment, the smart video recorder is both a sensing unit 21 and an event execution unit 22.

The sensing units 21 may also receive the event signals sent from the main controller unit 23. For example, in the case of the sensing unit 21 as an infrared break-beam sensor, when the user gets home and the infrared break-beam sensor receives the home event signal, the main controller unit 23 will turn off the infrared transmitter of the infrared break-beam sensor to reduce power consumption and increase life duration of the sensor.

Furthermore, as the user carries the mobile device 10 and may move in and out the range of signal communication, the event execution units 22 may repeatedly turn on and off relevant electric appliances to shorten the life duration of the relevant electric appliances simply because the mobile device 10 may switch between the states of establishing and losing connection with the main controller unit 23. To solve the problem, before determining if the mobile device passes the authentication procedure, the main controller unit 23 first checks the wireless signal strength of the mobile device 10 and performs the authentication procedure to determine if the mobile device 10 passes the authentication procedure when confirming that the wireless signal strength of the mobile device 10 is strong enough. Specifically, during the unmanned mode, the authentication unit 24 scans the mobile device 10; when the scanned signal strength of the mobile device 10 is not strong enough, the scanned wireless signal is ignored; the authentication unit 24 starts establishing connection with the mobile device 10 to perform the authentication procedure until the signal strength of the mobile device 10 is strong enough.

After receiving relevant event signals, the event execution units 22 may further take current environment conditions into account. For example, one event execution unit 22 is a lamp with a luminance meter, which detects luminance of the current environment, refers to the luminance of the current environment when receiving the home event signal, and automatically turns on the lamp when the luminance is not sufficient.

Although main functions of the event management device 20 can be achieved through the unmanned mode, the alert mode and the home mode, power consumption of the authentication unit 24 increases as a result of constant operation of the wireless module in the authentication unit 24. Besides, the authentication unit 24 may be installed on an inner side of a building, and to the end of saving power consumption, the mobile device 10 may employ wireless signal with relatively low power. Such necessity may demand for a shorter distance between the authentication unit 24 and the mobile device 10 for performing the authentication procedure and in turn causes activation of the sensing unit 21 when the user open the door at home. However, an unexpected alert event that bothers the user is triggered because authentication procedure between the authentication unit 24 and the mobile device 10 is not finished yet at the moment.

When the main controller unit 23 performs the unmanned mode, the main controller unit 24 monitors the event activation signal and, after receiving the event activation signal, performs the warning mode.

Figure 6A:
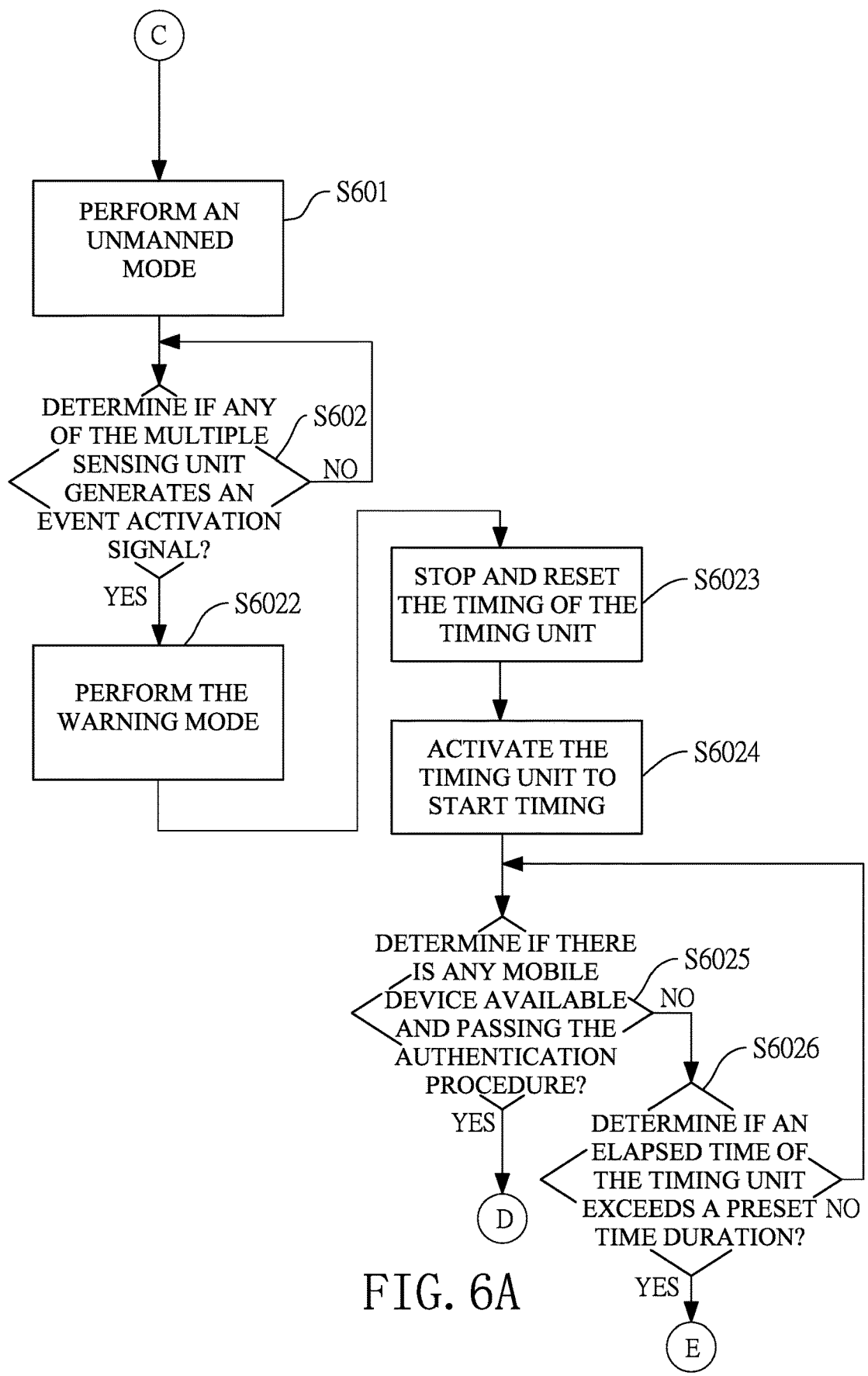
FIGS. 6A and 6B show a flow diagram of a second embodiment of an event management method in accordance with the present invention.
Figure 6B:
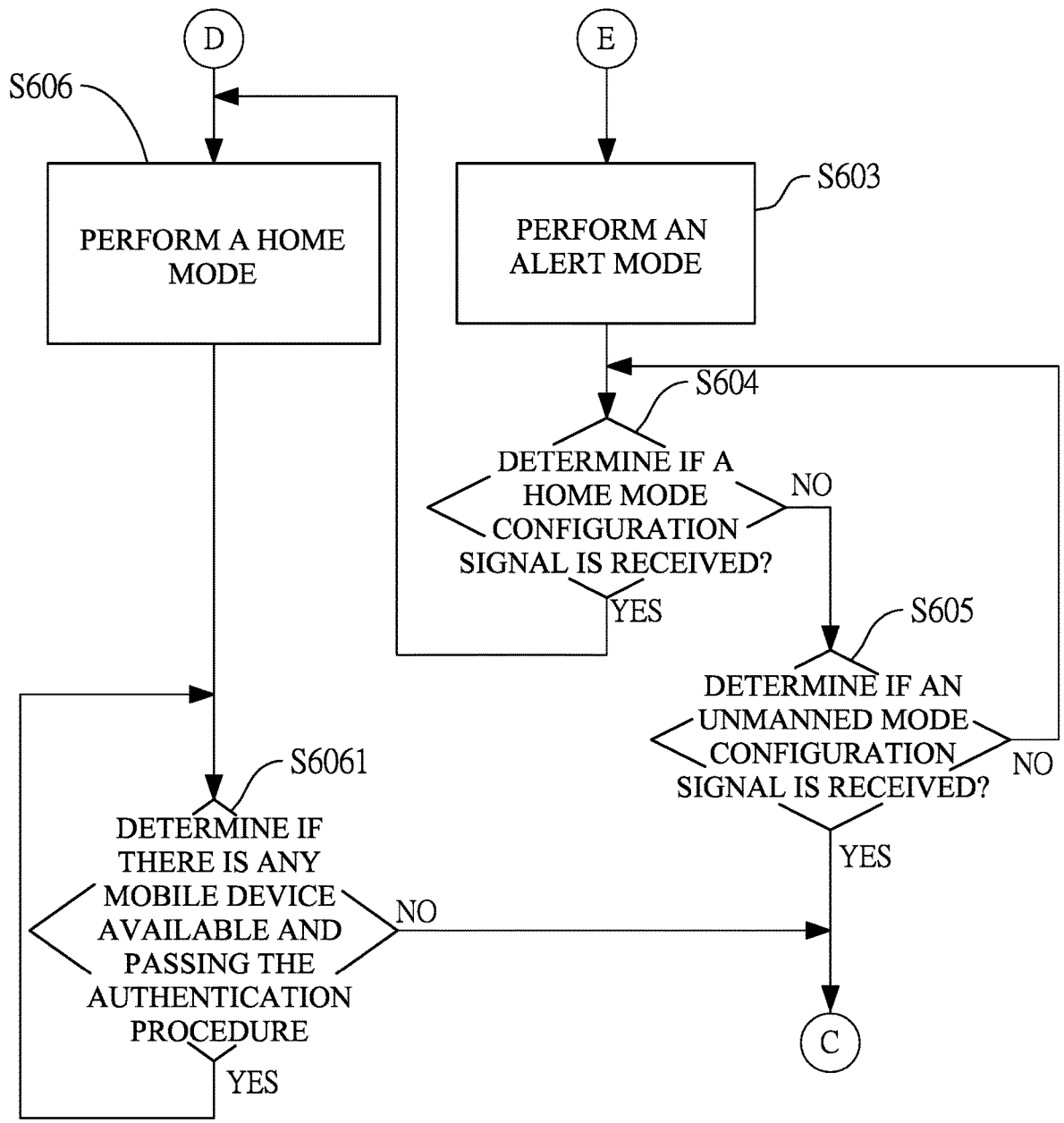

With reference to FIGS. 2, 6A and 6B, the event management device further includes a timing unit 25. Another embodiment of an event management method in accordance with the present invention is performed by the event management device and differs from the foregoing embodiment in that when the sensing unit generates the event activation signal, the main controller unit performs the following steps prior to the step for the alert mode (S603).

Step S6022: Perform the warning mode to generate a warning event signal and transmit the warning event signal to the event execution unit.

Step S6023: Stop and reset the timing of the timing unit.

Step S6024: Activate the timing unit to start timing.

Step S6025: Determine if there is any mobile device available and passing the authentication procedure. When there is any mobile device available and passing the authentication procedure, perform step S606. Otherwise, perform step S6026.

Step S6026: Determine if an elapsed time of the timing unit exceeds a preset time duration. When the elapsed time exceeds the preset time duration, perform step S603. Otherwise, resume step S6025.

The steps S603 to S606 that are analogous to step S103-S106 as illustrated in the foregoing embodiment in FIGS. 1A and 1B are not repeated here.

After performing the warning mode, the main controller unit 23 issues the warning event signal. Meanwhile, after activating the timing unit 25, the main controller unit 23 determines if there is any mobile device 10 available and passing the authentication procedure according to the receipt of the authentication completion signal. If there is any mobile device 10 spending a time duration, which is counted by the timing unit and does not exceed the preset time duration, to pass the authentication procedure, the main controller unit 23 performs the home mode. After the elapsed time counted by the timing unit exceeds the preset time duration and there is no any mobile device 10 passing the authentication procedure, the main controller unit 23 performs the alert mode. Hence, the authentication unit 24 is not required to activate the wireless module under the unmanned mode, thereby resulting in reduced power consumption. Additionally, there is no alert activation that bothers the user when the authentication procedure is performed.

As there is a time delay between generation of the event activation signal and the alert mode, supposing that the event execution unit 21 is a video or voice recorder, the event execution unit 21 fails to capture the critical video/voice if it starts recording since the receipt of the alert event signal. As a result, for the event execution unit 21 being a video recorder or voice recorder, recording should starts from the receipt of the warning event signal for avoidance of missing critical video/voice. After the warning mode is entered and the home event signal is received, the event execution unit 21 may delete the recorded video/voice for assurance of user's privacy or temporarily save the recorded video/voice and prioritize deletion of the recorded video/voice when the storage space for recording is insufficient, so as to gain more storage space. After the alert mode is entered, recording should continue until the user's intervention is detected or other event signal is received.

Despite the convenience provided by the event management device for monitoring a specific region, owing to source limitation of a standalone device, monitoring of a large area, such as huge house with a plenty of rooms or a factory, is hard to be fully provided. To address the resource limitation, multiple event management devices can be integrated into a large-scale system through network connection. Based on user's requirements and flexible adjustment, multiple event management devices can be integrated into a large-scale event management system, acting just like a single system performing actions corresponding to various events.

The foregoing event management system pertains to a regional system, and multiple regional systems can be integrated into a cross-region system, which is built according to a master-slave configuration. One of the multiple regional systems is chosen as a master system and the other regional systems are slave systems. One cross-region system may only has one master system and at least one slave system. Furthermore, the foregoing event management system further includes a bridging unit. In other words, each of the master system and the slave system has a bridging unit, and the bridging units of the master system and each slave system are connected through a network. In the present embodiment, the master system owns a main controller unit that similarly controls the sensing units, the event execution units and the authentication unit of the master system. Besides, the main controller unit receives signals sent from the bridging unit of each slave system through the bridging unit of the master system.

As such, in the cross-region system the main controller unit of the master system dominates the operation mode of the entire cross-region system. The bridging unit of each slave system is responsible for transmitting the signals of the sensing units and the authentication unit to the main controller unit of the master system, and receives the event signals sent from the main controller unit of the master system and transmits the event signals to the sensing units, the event execution units and the authentication unit.

The master system and each slave system of the cross-region system do not necessarily completely own the sensing units, the event execution unit and the authentication unit as long as they are available as far as the entire cross-region system is concerned. The configuration of the cross-region system is up to user's requirements.

Figure 7:
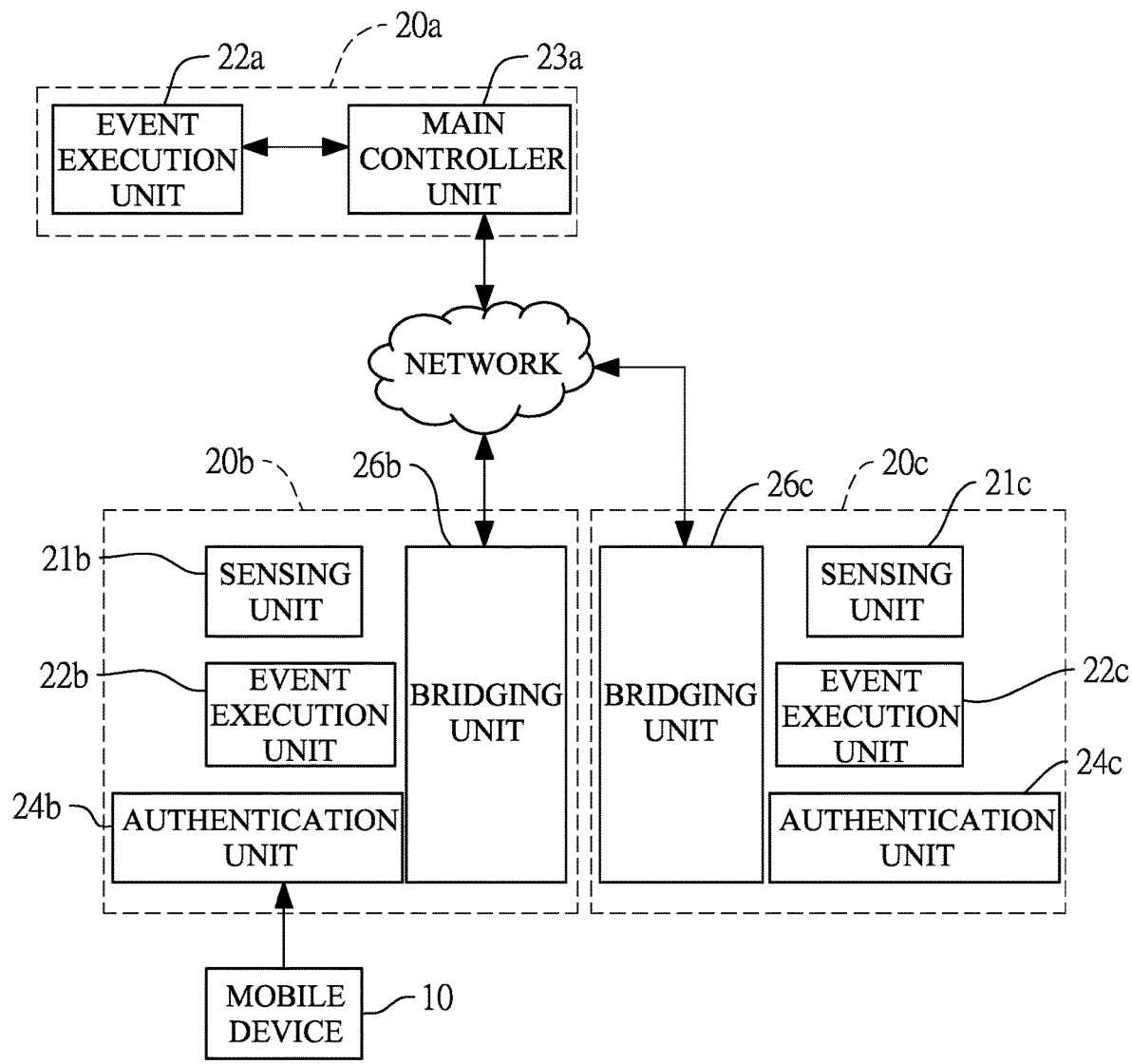
FIG. 7 is a functional block diagram of a system integrating multiple event management devices in FIG. 2.

For example, with reference to FIG. 7, the cross-region system includes a master system 20a and two slave systems 20b, 20c. The master system 20a owns an event execution unit 22a and a main controller unit 23a. One of the slave systems 20b owns a bridging unit 26b, a sensing unit 21b and an event execution unit 22b. The other slave system 20c owns a bridging unit 25c and an authentication unit 24c.

The main controller unit 23a of the master system 20a is connected to the bridging units 26b, 26c of the slave systems 20b, 20c through a network. The main controller unit 23a of the master system 20a receives the event activation signals from all the sensing units and the authentication completion/failure signals from the authentication unit 24b to determine a current mode to be performed. Similarly, when the main controller unit 23a intends to transmit a relevant event signal to the entire cross-region system, it is the main controller unit 23a of the master system 20a to transmit the event signal to the bridging units 26b, 26c of the slave systems 20b, 20c through the network. As a result, each unit of the cross-region system is allowed to perform corresponding action in a way similar to an independent system.

Because the cross-region system has two types of systems, namely the master system 20a and the slave systems 20b, 20c, users need to separately configure the two types of systems. Such complication in configuration bugs the user upon installation of the cross-region system. To lower the complication in installation, the master system 20a may be installed in a server for operation.

Figure 8:
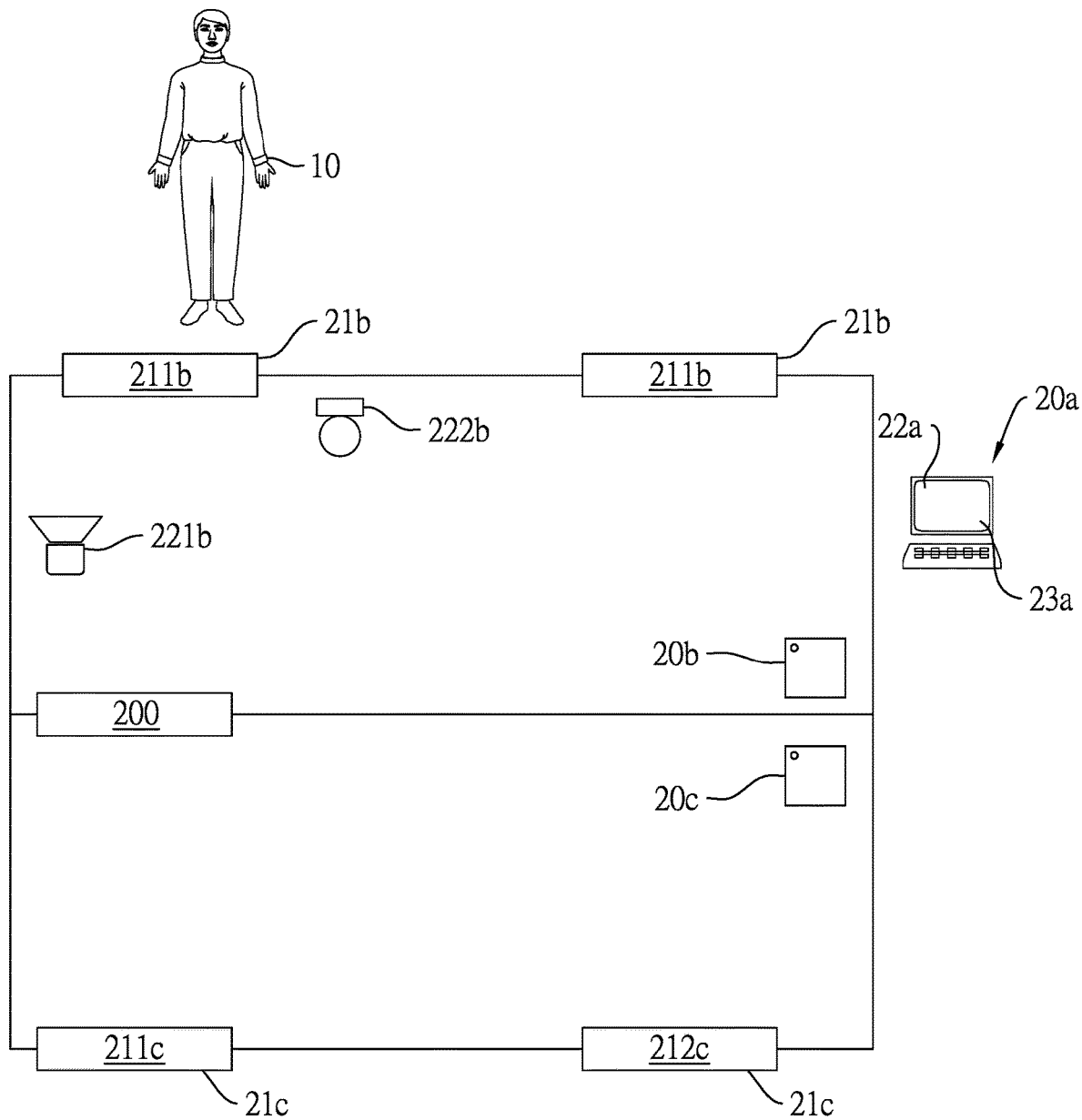
FIG. 8 is an operational diagram of the system in FIG. 7.

For example, with reference to FIGS. 7 and 8, the user has a house, which has two rooms. The front room is a store and the rear room is a storage room, and one door 200 is located between the two rooms. The store has a front door 211b and a front window 212b. The user installs a first intelligent electronic device in the store as the slave system 20b with a camera of the first intelligent electronic device directed to the front window for recording upon an intrusion event. The user further installs magnetic sensors on the front door 211b and the front window 212b as the sensing units 21b to sense break-in through the door 211b and the front window 212b. The store also has a siren speaker 221b and a lamp 222b taken as the event execution unit 22b.

Likewise, the storage room also has a rear door 211c and a rear window 212c. The user can also install magnetic sensors on the rear door 211c and the rear window 212c as the sensing units 21c to sense break-in through the rear door 211c and the rear window 212c. The user also installs a second intelligent electronic device as the slave system 20c with a camera of the second intelligent electronic device directed to the indoor space of the storage room.

The user carries a smart keychain 10, which is registered at the authentication unit. Besides, a server installed in the network is taken as the master system 20a. The master system 20a has a main controller unit 23a and an event execution unit 22a. The event execution unit 22a of the master system 20a is responsible for transmitting relevant message notification to the user.

The first intelligent electronic device 20b in the store includes the bridging unit 26b, the event execution unit 22b and the authentication unit 24b and jointly operates with the magnetic sensors on the front door 211b and the front window 212b, the siren speaker 221b and the lamp 222b to constitute the slave system 20b. The second intelligent electronic device 20c in the storage room includes the bridging unit 26c and the event execution unit 22c and jointly operates with the magnetic sensors on the rear door 211c and the rear window 212c to constitute the slave system 20c.

After the cross-region system is activated, the main controller unit 23a of the master system 20a enters the unmanned mode. When the front door 211b is open, the magnetic sensor on the front door 211b transmits the event activation signal to the bridging unit 26b of the slave system 20b. The bridging unit 26b of the slave system 20b further transmits the event activation signal to the main controller unit 23a of the master system 20a. The main controller unit 23a then switch to the alert mode and transmit the alert event signal to the event execution unit 22a of the master system 20a and notify user of the current situation. Moreover, the main controller unit 23a transmits the alert event signal to the bridging units 26b, 26c of the slave systems 20b, 20c. After receiving the alert event signal, the bridging units 26b, 26c transmit the alert event signal to the event execution units 22b, 22c of the slave systems 20b, 20c to perform corresponding actions. For example, the camera modules of the slave systems 20b, 20c start recording and upload the recorded video to the server for the user to instantly watch the current situation at home and take corresponding actions, if necessary.

Also, after the user leave the house, the authentication unit 24b of the master system 20b transmits the authentication failure signal to the bridging unit 26b of the slave system 20b, which further transmits the authentication failure signal to the main controller unit 23a of the master system 20a. After being aware that there is no any mobile device 10 in the cross-region system passing the authentication procedure, the main controller unit 23a switches to the unmanned mode and transmits the unmanned event signal to the slave systems 20b, 20c. At the moment, the slave systems 20b, 20c may activate the sensing units 21b, 21c to monitor any activation signal.

Based on the described operation, the slave systems of the entire cross-region system act like an independent and standalone system not limited by the resource limitations of the slave system but being expandable in terms of system configuration on the user's demand.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An event management method performed by a main controller unit of an event management device, wherein the event management device includes at least one sensing unit and at least one event execution unit, and the event management method comprises:
performing an unmanned mode;
determining if any of the at least one sensing unit generates an event activation signal;
when determining that no event activation signal is generated, resuming determining if any of the at least one sensing unit generates the event activation signal;
when determining that the event activation signal is generated, performing a warning mode to generate a warning event signal and transmit the warning event signal to the corresponding event execution unit;
stopping and resetting timing of a timing unit of the event management device;
activating the timing unit to start timing;
determining if there is any mobile device passing an authentication procedure;
when there is any mobile device passing the authentication procedure, performing a home mode; otherwise, determining if an elapsed time of the timing unit exceeds a preset time duration; and
when the elapsed time exceeds the preset time duration, performing an alert mode; otherwise, resuming determining if there is any mobile device passing the authentication procedure.

2. The method as claimed in claim 1, wherein when performing the home mode, the method further comprises:
determining if there is any mobile device passing the authentication procedure;
when determining that there is any mobile device passing the authentication procedure, performing the home mode; otherwise, performing the unmanned mode.

3. The method as claimed in claim 1, wherein when determining that no event activation signal is generated, the method further comprises:
determining if there is any mobile device passing the authentication procedure; and
when determining that there is any mobile device passing the authentication procedure, performing the home mode, otherwise, resuming determining if any of the at least one sensing unit generates the event activation signal.

4. The method as claimed in claim 1, wherein when performing the alert mode, the method further comprises:
determining if the main controller unit receives a home mode configuration signal;
when determining that the home mode configuration signal is received, performing the home mode;
when determining that the home mode configuration signal is not received, determining if the main controller unit receives an unmanned mode configuration signal; and
when determining that the unmanned mode configuration signal is received, performing the unmanned mode, otherwise, resuming determining if the main controller unit receives the home mode configuration signal.

5. An event management device, comprising:
at least one sensing unit;
at least one event execution unit; and
a main controller unit performing an unmanned mode, and determining if any of the at least one sensing unit generates an event activation signal and transmits the event activation signal to a main controller unit;
a timing unit;
wherein when the event activation signal is not generated by any of the at least one sensing unit, the main controller unit resumes determining if any of the at least one sensing unit generates the event activation signal;
wherein when any of the at least one sensing unit generates the event activation signal, the main controller unit performs steps of:
performing a warning mode to generate a warning event signal and transmit the warning event signal to the corresponding event execution unit;
stopping and resetting timing of the timing unit;
activating the timing unit to start timing;
determining if there is any mobile device passing an authentication procedure;
when there is any mobile device passing the authentication procedure, performing a home mode; otherwise, determining if an elapsed time of the timing unit exceeds a preset time duration; and
when the elapsed time exceeds the preset time duration, performing an alert mode; otherwise, resuming determining if there is any mobile device passing the authentication procedure.

6. The device as claimed in claim 5, wherein when the main controller unit performs the home mode, the main controller unit further determines if there is any mobile device passing the authentication procedure;
when determining that there is any mobile device passing the authentication procedure, the main controller unit performs the home mode; otherwise, the main controller unit performs the unmanned mode.

7. The device as claimed in claim 5, further comprising at least one authentication unit, and performing the authentication procedure to determine if there is any mobile device passing the authentication procedure;
wherein
when determining that there is any mobile device passing the authentication procedure, the authentication unit generates an authentication completion signal and transmits the authentication completion signal to the main controller unit; and
when the main controller unit receives the authentication completion signal, the main controller unit determines if there is any mobile device passing the authentication procedure.

8. The device as claimed in claim 5, wherein
when the main controller unit performs the unmanned mode and when the event activation signal is not generated by any of the at least one sensing unit, the main controller unit further determines if there is any mobile device passing the authentication procedure; and
when determining that there is any mobile device passing the authentication procedure, the main controller unit performs the home mode; otherwise, the main controller unit resumes determining if any of the at least one sensing unit generates the event activation signal.

9. The device as claimed in claim 5, wherein when the main controller unit performs the alert mode, the main controller unit further determines if a home mode configuration signal is received;
wherein when determining that the home mode configuration signal is not received, the main controller unit determines if the main controller unit receives an unmanned mode configuration signal; otherwise, the main controller unit performs the home mode; and
wherein when determining that the unmanned mode configuration signal is received, the main controller unit performs the unmanned mode; otherwise, the main controller unit resumes determining if the main controller unit receives the home mode configuration signal.

10. The device as claimed in claim 7, wherein the authentication procedure performed by the authentication unit comprises steps of:
determining if a wireless signal transmitted from the mobile device is received;
when the wireless signal from the mobile device is received, determining if the device information in the wireless signal is identical to the registration information upon registration of the mobile device at the authentication unit;

when the device information is identical to the registration information, determining if the device information of the wireless signal has been recorded in a recording list;

when the device information has been recorded in the recording list, updating the recording list by changing a recorded time corresponding to the device information of the wireless signal to a current time and resuming determining if the wireless signal of the mobile device is received;

when the device information has not been recorded in the recording list, recording the device information and the current time in the wireless signal in the recording list and generating and transmitting the authentication completion signal and resuming determining if the wireless signal of the mobile device is received;

when the device information is not identical to the registration information, resuming determining if a wireless signal transmitted from the mobile device is received; and when the wireless signal from the mobile device is not received, determining if a time gap between the recorded time corresponding to each piece of device information in the recording list and the current time is greater than a preset time duration;

when the time gap is greater than the preset time duration, removing the piece of device information corresponding to the recorded time with a time gap elapsed therefrom to the current time exceeding the preset time duration from the recording list, generating an authentication failure signal, and resuming determining if the wireless signal of the mobile device is received; otherwise, resuming determining if the wireless signal of the mobile device is received.

11. The device as claimed in claim 7, wherein the authentication procedure performed by the authentication unit comprises steps of:

determining if the authentication unit successfully establishes connection with the registered mobile device;

when the connection is successfully established, recording the device information of the mobile device successfully establishing connection in the recording list, generating and transmitting the authentication completion signal, and resuming determining if the authentication unit successfully establishes connection with the registered mobile device;

determining if the mobile device successfully establishes connection and loses connection, removing the device information of the mobile device successfully establishing its connection and then losing its connection from the recording list, and generating an authentication failure signal and resuming determining if the authentication unit successfully establishes connection with the registered mobile device; and when the connection is not successfully established, resuming determining if the authentication unit successfully establishes connection with the registered mobile device.

12. The device as claimed in claim 7, wherein when the main controller unit performs the home mode, the authentication unit performs a reconnection authentication procedure, wherein the reconnection authentication procedure comprises steps of:

stopping and resetting the timing unit and starting timing of the timing unit;

determining if the registered mobile device is successfully connected with the authentication unit;

when the registered mobile device is successfully connected, determining if the device information of the successfully connected mobile device is recorded in a reconnection list;

when the device information of the successfully connected mobile device is recorded in the reconnection list, removing the device information of the successfully connected mobile device from the reconnection list, recording the device information of the successfully connected mobile device in the connection list, and resuming determining if the registered mobile device is successfully connected with the authentication unit;

when the device information of the successfully connected mobile device is not recorded in the reconnection list, recording the device information of the successfully connected mobile device in the connection list, generating and transmitting the authentication completion signal containing the device information of the successfully connected mobile device and resuming determining if the registered mobile device is successfully connected with the authentication unit;

when the registered mobile device is not successfully connected, determining if the successfully connected mobile device has lost its connection;

when the connection is lost, removing the device information of the mobile device losing connection from the connection list, recording the device information of the mobile device losing connection and a current time in the reconnection list, and resuming determining if the registered mobile device is successfully connected with the authentication unit;

when the connection remains, determining a time gap between the time corresponding to the device information of the mobile device losing connection and the current time exceeds a preset time duration;

when the time gap exceeds the preset time duration, removing the device information of the mobile device losing connection from the reconnection list, generating and transmitting the authentication failure signal, and resuming determining if the registered mobile device is successfully connected with the authentication unit; and when the time gap does not exceed the preset time duration, resuming determining if the registered mobile device is successfully connected with the authentication unit.

13. The device as claimed in claim 7, wherein the mobile device saves passwords which are used to log in the authentication unit;

wherein when the mobile device logs in the authentication unit, the mobile device successfully establishes connection with the authentication unit, and the mobile device passes the authentication procedure.

14. The device as claimed in claim 5, further comprising a smart phone;

wherein the smart phone has software application installed therein and comprises the main controller unit.

15. The device as claimed in claim 5, further comprising a server installed in a network;

wherein the server comprises the main controller unit.

16. The device as claimed in claim 7, wherein the main control unit receives the authentication completion signal through a network.

17. The device as claimed in claim 5, wherein the event execution unit receives the warning event signal through a network.

\* \* \* \* \*